United States Patent [19]

Espin

[11] Patent Number: 4,765,050

[45] Date of Patent: Aug. 23, 1988

[54] APPARATUS AND METHOD FOR DISASSEMBLING A MAGNETIC TAPE CASSETTE

[76] Inventor: Mario W. Espin, 5333 The Plaza, Charlotte, N.C. 28215

[21] Appl. No.: 40,647

[22] Filed: Apr. 21, 1987

[51] Int. Cl.[4] .................. B23P 19/02; B23P 21/00; B23P 23/04

[52] U.S. Cl. .................. 29/426.4; 29/773; 29/402.04; 29/33 K; 242/198; 414/412; 408/3; 411/910

[58] Field of Search .............. 29/426.4, 773, 33 K, 29/402.04, 402.08, 426.5; 242/171, 198, 54.1; 414/411, 412; 408/31; 81/3.2; 411/910

[56] References Cited

U.S. PATENT DOCUMENTS

| | | | |
|---|---|---|---|
| 1,300,275 | 4/1919 | Johnson | 411/910 X |
| 2,049,101 | 7/1936 | Baker | 29/426.4 X |
| 2,267,336 | 12/1941 | Kindelberger | 408/3 |
| 2,879,341 | 3/1959 | Kucher | 242/198 X |
| 2,975,661 | 3/1961 | Coleman | 408/3 |
| 3,145,589 | 8/1964 | Jonker | 408/3 |
| 3,579,801 | 5/1971 | Ishihara | 29/426.4 |
| 3,921,278 | 11/1975 | Basu | 29/426.6 |
| 4,477,957 | 10/1984 | Inman | 29/402.08 |
| 4,496,118 | 1/1985 | Aishi et al. | 242/198 |
| 4,543,151 | 9/1985 | Aldo | 81/3.2 X |

*Primary Examiner*—Charlie T. Moon
*Attorney, Agent, or Firm*—Shefte, Pinckney & Sawyer

[57] ABSTRACT

An apparatus and method for disassembling a magnetic tape cassette of the type having at least two housing members assembled by a fastener extending through one housing member and attaching internally to the other housing member. The apparatus includes a template for identifying the internal attachment location of the fastener on the other housing member and means for penetrating the other housing member for opening access to the fastener to permit the fastener to be expelled from the housing members for disassembly of the cassette.

13 Claims, 5 Drawing Sheets

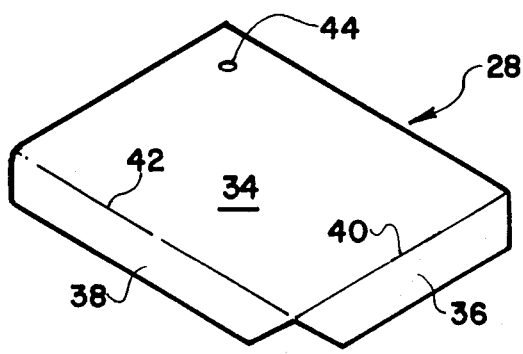
FIG. 2
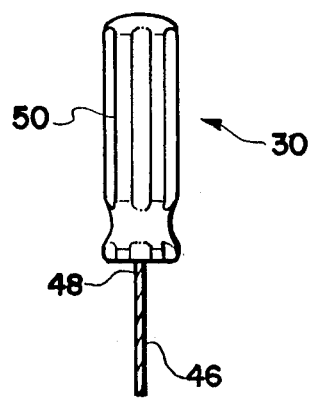
FIG. 3
FIG. 4
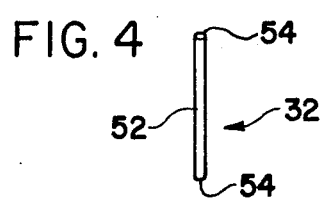

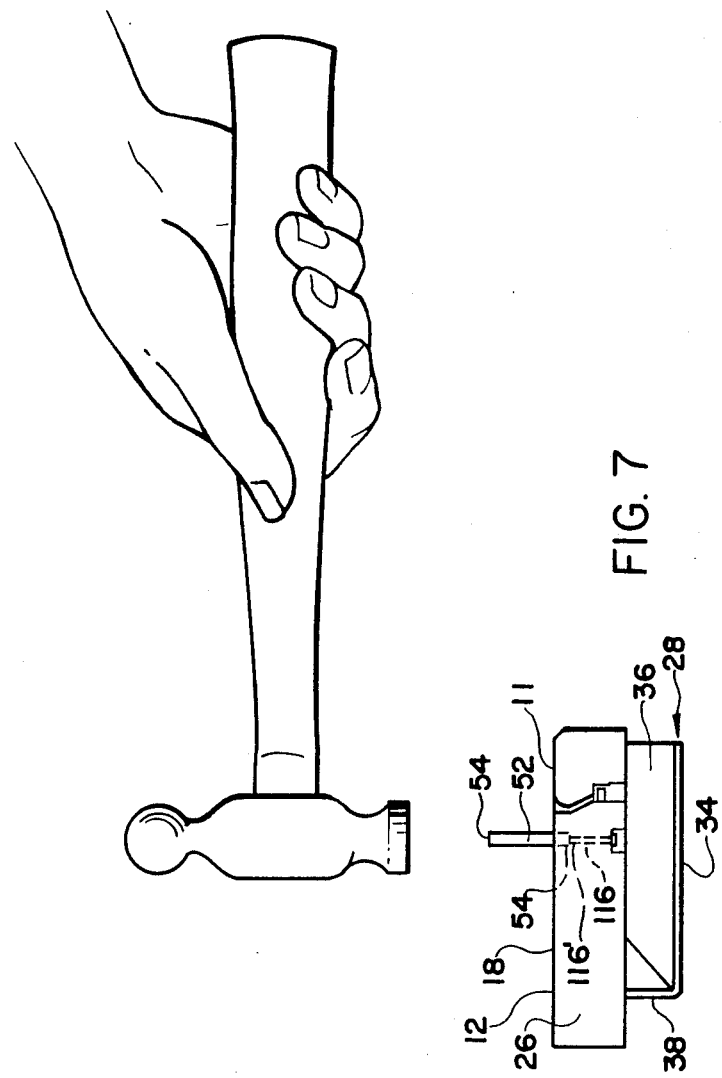

APPARATUS AND METHOD FOR DISASSEMBLING A MAGNETIC TAPE CASSETTE

BACKGROUND OF THE INVENTION

The present invention relates to an apparatus and method for disassembling a magnetic tape cassette and more particularly a prerecorded cassette of the type having at least one two housing members which are fastened together by a rivet, screw with an unconventional head, or other type of antitamper fastener.

The housings of conventional prerecorded video tape cassettes are generally secured together by at least one rivet, a screw formed with an antitamper head or another like fastener means adapted to discourage or prevent internal access to the cassette to deter tampering, substitution or theft of the tape stored within the cassette housing. Disadvantageously, however, such antitamper devices also prevent the cassette owner form obtaining legitimate access to the tape and internal mechanism of the cassette to perform repairs or maintenance. To illustrate, disassembly of such a cassette is necessary to splice a tape which has inadvertently split with the broken end being wound into the cassette housing or to free a reel which has jammed, in order to return the cassette to a serviceable condition. It is difficult to overcome common cassette antitamper devices to perform such repairs without creating a significant risk of permanently damaging or even destroying the cassette housing. Thus, antitamper devices of the type described often prevent the accomplishment of needed video cassette repairs and result in the undesirable discarding of serviceable cassettes. Given the relatively expensive nature of conventional prerecorded tape cassettes, this is a bothersome problem to cassette owners, particularly dealers who operate cassette lending libraries.

SUMMARY OF THE INVENTION

It is therefore a principal object of the present invention to provide an apparatus and method by which video tape cassettes of the described type may be easily disassembled without risk of damage for purposes of legitimate repair and maintenance.

Briefly described, the apparatus and method of the present invention is adapted for disassembling a magnetic tape cassette of the type having at least two housing members joined together by at least one rivet or other antitamper type fastener extending through one housing member and attaching internally to the other housing member of the cassette. A template is utilized for positioning on the other housing member to identify exteriorly thereon the location of attachment internally thereto of the rivet or fastener. An auger is also provided for penetrating the other housing member at the fastener attachment location to provide opening access to the fastener through the other housing member to permit the fastener to be expelled outwardly from the one housing member, thereby permitting the housing members to be separated for disassembly of the cassette.

In the preferred embodiment, the template has a main body portion which corresponds in shape with the other housing member of the cassette for facing abutment with the outward face of the other housing member and at least two side portions extend from the periphery of the main body portion for abutting corresponding sides of the other housing member to position the template thereon.

At least one hole is formed through the main body portion of the template at a location thereon to be aligned with the location exteriorly on the outward face of the other housing member corresponding to the interior location of attachment thereto of the fastener when the template is positioned on the other housing member. The auger is adapted for operation through the hole in the template to drill an access opening through the other housing member to open access to the fastener through the other housing member. A punch is also provided for insertion through the opening drilled with the auger in the other housing member for driving contact with the fastener to forceably expel it outwardly from the one housing member.

A replacement fastener may also be provided in the preferred embodiment to be inserted at the location of the removed fastener to reattach the housing members in assembly.

BRIEF DESCRIPTION OF THE DRAWINGS

FIG. 2 is a perspective view of the template according to the preferred embodiment of the present invention;

FIG. 3 is a side elevational view of the auger according to the preferred embodiment of the present invention;

FIG. 4 is a side elevational view of the punch according to the preferred embodiment of the present invention;

FIG. 7 is a side view showing the punch operation as in FIG. 6.

DESCRIPTION OF THE PREFERRED EMBODIMENT

Figure 1A:
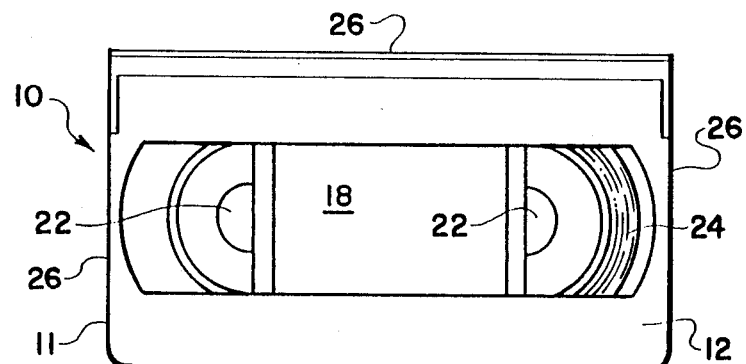
FIG. 1A is a top plan view of a standard conventional video tape cassette.
Figure 1B:
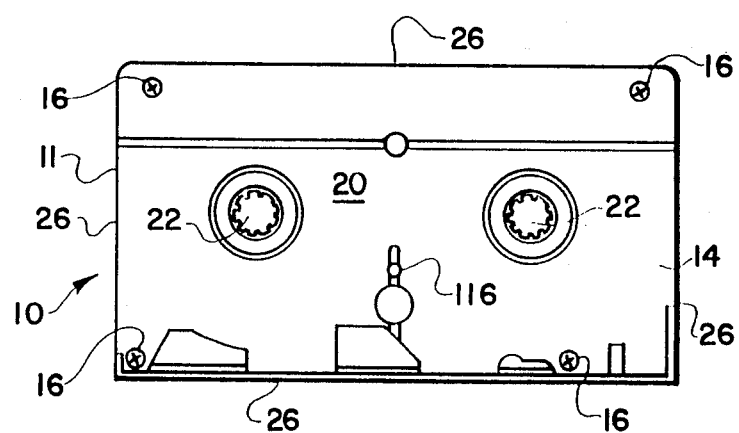
FIG. 1B is a bottom plan view of the cassette of FIG. 1A.

Referring now to the accompanying drawings and initially to FIGS. 1A and 1B, a standard video magnetic tape cassette is indicated generally at 10. Such cassettes 10 conventionally have a housing 11 formed by at least two housing members, a top housing member 12 shown in FIG. 1A and a bottom housing member 14 shown in FIG. 1B. The housing members 12,14 are assembled by a plurality of screws or similar fasteners 16 (FIG. 1B) extending through the bottom housing member 14 and attaching internally to the top housing member 12 so that the inward penetrating ends of the fasteners are not exposed at the outward face of the top housing member 12. Conventional prerecorded video tape cassettes generally have a central antitamper type fastener 116, although one or all of the other fasteners 16 could also be of this type. The antitamper fastener 116 is commonly a rivet or screw formed with an antitamper head to discourage or prevent internal access to the cassette 10. The housing members 12,14 when assembled form the housing 11 in a substantially rectangular parallelipiped shaped with parallel spaced top and bottom faces 18,20 and four sides 26 extending perpendicularly between the top and bottom faces 18,20. Internal to the cassette are two rotatable reels 22 in coplanar adjacency carrying a length of magnetic tape 24, the ends of which are wound in opposed relation on the reels 22 such that when one reel 22 is rotated so as to take up the tape 24, the other reel 22 will rotate so as to pay out the tape 24.

Basically, the apparatus of the present invention includes a template, indicated generally at 28 in FIG. 2, adapted for placement on the cassette housing member 12 to locate the antitamper fastener 116; an auger or other suitable device, indicated generally at 30 in FIG. 3, capable of penetrating the cassette housing member 12 at the fastener location; and a punch member indicated generally at 32 in FIG. 4, for use in expelling the fastener 116, all as more fully described hereinafter.

As best illustrated in FIG. 2, the template 28 has a substantially flat, rectangularly shaped main body portion 34 and two flat side portions 36,38 extending substantially perpendicularly from an end edge 40 and a side edge 42 along the periphery of the main body portion 34 with the two side portions 36,38 forming essentially a right angle with one another. Thus, the template 28 of the preferred embodiment of the present invention corresponds to the parallelipiped shape of the cassette housing 11 to be adapted to fit on the housing 11 with the main body portion 34 and side portions 36,38 of the template 28 placed in respective abutment with the face 18 of the top housing member 12 and two corresponding sides 26 of the cassette housing 11. The main body portion 34 has at least one hole 44 formed therethrough at a location corresponding to the location of the interior attachment of the fastener 116 to the top housing member 12 in order to be aligned in direct overlying relation to such location to identify through the hole 44 the corresponding location exteriorly on the top housing member 12 of the cassette 10 when the template 28 is positioned on the top housing member 12 as described.

Figure 5:
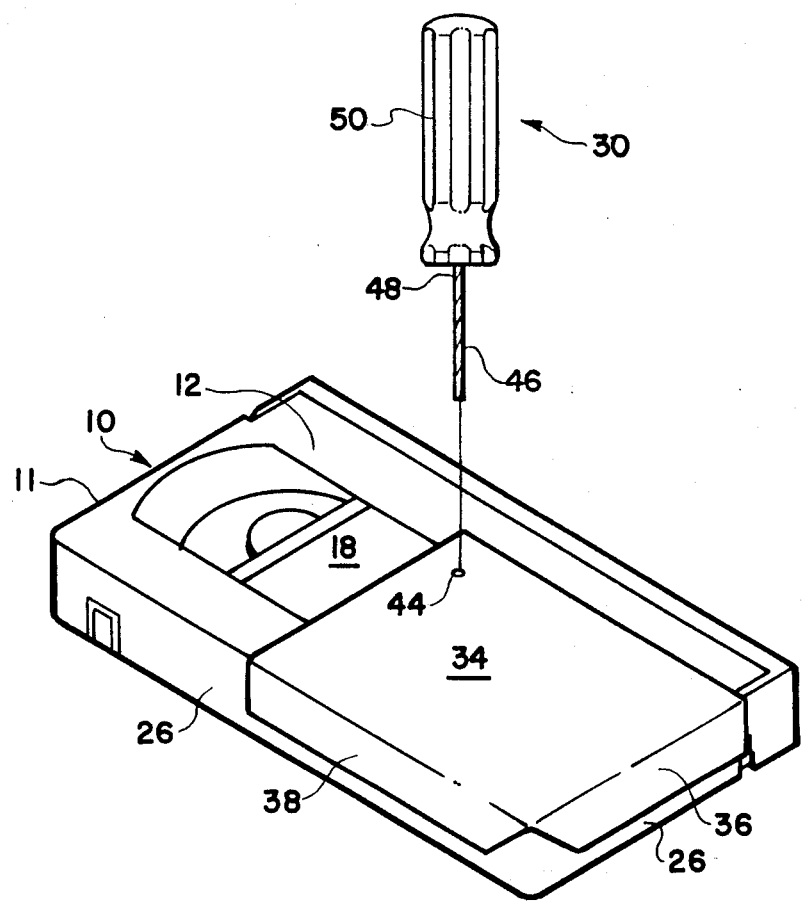
FIG. 5 is a perspective view illustrating the template and auger in use with the cassette of FIG. 1 for identification of an antitamper fastener attachment location and for drilling of an access opening in the top housing member of the cassette.

The auger 30 of the preferred embodiment of the present invention is preferably a standard drill bit 46, the shank 48 of which is embedded in a plastic or other suitable handle 50, similar to that of a standard screwdriver. The auger 30 is adapted for manual operation through the hole 44 in the main body portion 34 of the template 28 to drill a small opening 56 (FIGS. 6 and 7) through the top housing member 12 at the location identified exteriorly thereon of attachment thereto of the fastener 116 as illustrated in FIG. 5 to form an opening exposing and providing direct access to the concealed inward end 116' (FIG. 7) of the fastener 116 through the top housing member 12.

Figure 6:
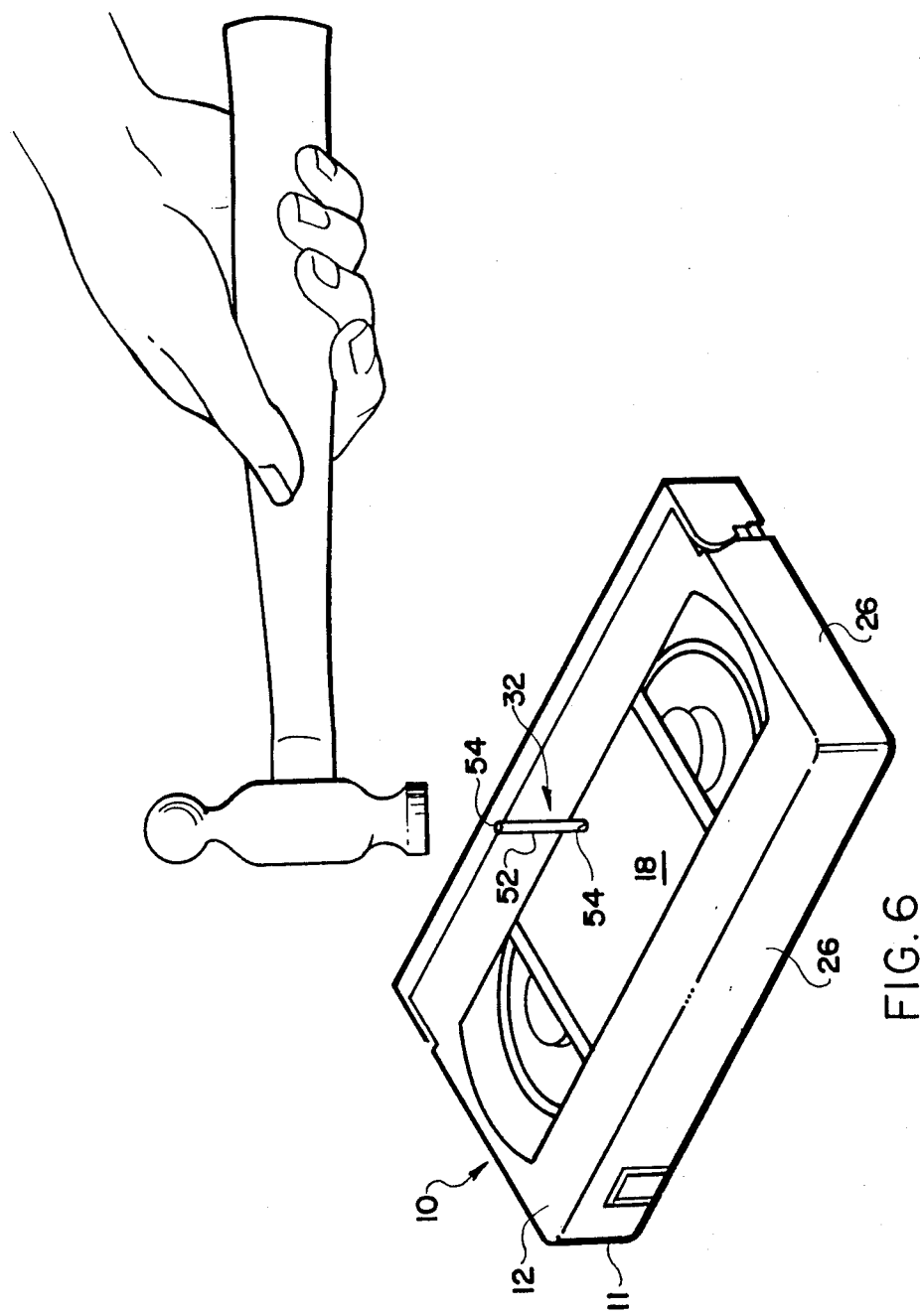
FIG. 6 is a perspective view showing operation of the punch in the drilled opening, formed as in FIG. 5, for removing the antitamper fastener.

The punch 32 is preferably a cylindrical metallic rod 52 of approximately the diameter of the drill bit 46 so that either end portion 54 of the rod 52 is capable of insertion through the drilled opening 56 in the top housing member 12 to be in driving contact with the concealed inward end 116' of the fastener 116. Thus, the rod 52 may be utilized as a driving member to be hammered as shown in FIGS. 6 and 7 to act on the concealed fastener end 116' to forceably disengage the fastener 116 from the top housing member 12 and to expel the fastener 116 outwardly from the bottom housing member 14. As seen in FIG. 7, the template 28 may be positioned on a work table or other suitable surface in an inverted disposition with the side portions 36,38 extending upwardly to support the cassette 10 on the upstanding side portions 36,38 at a spacing above the table to enable complete removal of the fastener 116 from the cassette 10. Thereupon the cassette housing members 12,14 may be separated to obtain access to the interior components of the cassette 10 to perform necessary repairs and maintenance.

Following repair of the cassette, the housing members 12,14 are reassembled utilizing the original fasteners 16 and, if suitable, the original rivet or antitamper fastener 116. As will be understood, however, when the described operation of the present invention is performed on a threaded or other similar fasteners the top housing member 12 of the cassette 10 may no longer accept the original fastener 116. In such case, a slightly enlarged self-tapping screw may be provided for a replacement of the fastener 116, if needed, such a screw being adapted to tap into the top housing member 12 at the same location as the removed fastener 116 to reattach the housing members 12,14 in assembly.

The simplicity and utility of the apparatus of the present invention for disassembling a magnetic tape cassette will thus be readily discerned. The present invention advantageously provides owners of prerecorded tapes a set of easily usable tools and a simple method for disassembling a cassette 10 for repair and maintenance of the component parts internal to the cassette. The serviceability of the cassette 10 can therefore be prolonged, and the owner's investment preserved.

As previously mentioned, any number or all of the fasteners 16 may be of one or more varying antitamper types. In such situations, it is contemplated that the template 28 may be provided with a plurality of holes 44 formed in the main body portion 34 as necessary to identify any one or more or all fastener locations and to enable removal of any and all antitamper fasteners utilized.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited onlyl by the claims appended hereto and the equivalents thereof.

I claim:

1. An apparatus for disassembling a magnetic tape cassette of the type having at least two housing members assembled by at least one fastener extending through one housing member and attaching internally to the other housing member in a concealed manner, said apparatus comprising template means for positioning on said other housing member to identify exteriorly thereon the location of attachment thereto of said concealed fastener, means for penetrating said other housing member at said fastener attachment location to form opening access to said fastener through said other housing member, and means for expelling said fastener outwardly from said one housing member, thereby to permit said housing members to be separated for disassembly of said cassette.

2. An apparatus according to claim 1 and characterized further in that said template means has at least one hole therethrough and corresponds in shape with said other housing member for facing abutment therewith to identify through said hole said fastener attachment location exteriorly on said other housing member.

3. An apparatus according to claim 2 and characterized further in that said template means includes a main body portion for facing abutment with an outward face of said other housing member and at least two side portions extending from the periphery of said main body portion for abutting corresponding sides of said other housing member to position said template means on said other housing member.

4. An apparatus according to claim 1 and characterized further in that said means for penetrating said other housing member at said fastener attachment location includes an auger adapted for operation through said hole in said template to drill through other housing member to open access to said fastener through said other housing member.

5. An apparatus according to claim 4 and characterized further in that said expelling means includes a punch having an end portion adapted for insertion through said drilled opening in said other housing member for driving contact with said fastener to forceably expel said fastener outwardly from said one housing member, thereby to permit said housing members to be separated for disassembly of said cassette.

6. An apparatus according to claim 1 and characterized further in that said apparatus includes a replacement fastener for insertion through said one housing member and attachment to said other housing member at the same location as said removed fastener to reattach said cassette housing members in assembly.

7. An apparatus for disassembling a magnetic tape cassette of the type having at least two housing members assembled by at least one fastener extending through one housing member and attaching internally to the other housing member in a concealed manner, said apparatus comprising:
  template means having a main body portion corresponding in shape with said other housing member for facing abutment with an outward face of said other housing member and at least two side portions extending from the periphery of said main body portion for abutting corresponding sides of said other housing member, said main body portion having at least one hole therethrough located to be aligned with the location exteriorly on said other housing member corresponding to the interior location of attachment thereto of said concealed fastener when said template means is positioned on said other housing member;
  means for penetrating said other housing member at said fastener attachment location including an auger adapted for operation through said hole in said main body portion of said template means to drill an opening through said other housing member to open access to said fastener through said other housing member; and
  a punch having an end portion adapted for insertion through said drilled opening in said other housing member for driving contact with said fastener to forceably expel said fastener outwardly from said one housing member, thereby to permit said housing members to be separated for disassembly of said cassette.

8. An apparatus according to claim 7 and characterized further in that said apparatus includes a replacement fastener for insertion through said one housing member and attachment to said other housing member at the same location as said removed fastener to reattach said housing members in assembly.

9. A method of disassembling a magnetic tape cassette of the tape having at least two housing members assembled by at least one fastener extending through one housing member and attaching internally to the other housing member in a concealed manner, said method comprising:
  identifying exteriorly on said other housing member the location of attachment thereto to said concealed fastener,
  penetrating said other housing member at said fastener attachment location to form opening access to said fastener through said other housing member and expelling said fastener outwardly from said one housing member, thereby to permit said housing members to be separated for disassembly of said cassette.

10. A method according to claim 9 and characterized further in that said identifying includes providing a template having at least one hole therethrough and corresponding in shape with said other housing member and placing said template in facing abutment with said other housing member to identify through said hole said fastener attachment location exteriorly on said other housing member.

11. A method according to claim 9 and characterized further in that said penetrating includes drilling an opening through said other housing member at said fastener attachment location to open access to said fastener through said other housing member.

12. A method according to claim 9 and said expelling step being characterized further by providing a punch having an end portion adapted for insertion through said access opening in said other housing member, positioning said end portion of said punch within said access opening in contact with said fastener, and driving said punch against said fastener to forceably expel said fastener outwardly from said one housing member, thereby to permit said housing members to be separated for disassembly of said cassette.

13. A method according to claim 9 and characterized further by reasesmbling of said housing members by inserting a replacement fastener through said one housing member and attaching said replacement fastener to said other housing member at the same location as said removed fastener to reattach said cassette housing members in assembly.

* * * * *

UNITED STATES PATENT OFFICE
CERTIFICATE OF CORRECTION

Patent No. 4,765,050        Dated August 23, 1988

Inventor(s)  Mario W. Espin

It is certified that error appears in the above-identified patent and that said Letters Patent is hereby corrected as shown below:

Col. 1, line 9   delete "one".
Col. 1, line 35  After "prerecorded" insert — video —.
Col. 3, line 1   delete "shaped" and insert — shape —.
Col. 4, line 57  delete "onlyl" and insert — only —.
Col. 5, line 25  after "through" insert — said —.
Col. 6, line 18  delete "tape" and insert — type —.
Col. 6, line 24  delete "to" and insert — of —.
Col. 6, line 58  delete "reasesmbling" and insert — reassembling —.

Signed and Sealed this

Thirteenth Day of February, 1990

Attest:

JEFFREY M. SAMUELS

Attesting Officer        Acting Commissioner of Patents and Trademarks